(12) United States Patent
Shields et al.

(10) Patent No.: US 8,373,141 B1
(45) Date of Patent: Feb. 12, 2013

(54) PHOTOGRAPHING AND MEASURING A TERRITORIAL RADIATION FIELD

(75) Inventors: Garry E. Shields, Ashburn, VA (US);
Paul W. Brown, Columbia, MD (US);
Gordon K. Riel, Edgewater, MD (US);
Robert D. Rogalski, Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 771 days.

(21) Appl. No.: 12/567,814

(22) Filed: Sep. 28, 2009

(51) Int. Cl.
*G01T 1/04* (2006.01)
(52) U.S. Cl. .................................................. 250/473.1
(58) Field of Classification Search ............... 250/473.1, 250/474.1, 484.2, 581
See application file for complete search history.

(56) References Cited

U.S. PATENT DOCUMENTS

| 7,476,874 B2 | 1/2009 | Patel |
| 2008/0023647 A1* | 1/2008 | Patel .......................... 250/473.1 |

OTHER PUBLICATIONS

Gordon K. Riel, Patrick Winters, Gordhan Patel and P. Patel, Self-Indicating Radiation Alert Dosemeter (SIRAD), Radiation Protection Dosimetry (2006), vol. 120, No. 1-4, pp. 259-162, Mar. 24, 2006.

* cited by examiner

*Primary Examiner* — David Porta
*Assistant Examiner* — Faye Boosalis
(74) *Attorney, Agent, or Firm* — Richard A. Morgan

(57) ABSTRACT

Dosimeter chips are widely distributed over a territorial area. This is followed by photographing the area from above to produce a color photograph. The color photograph is compared with radiation/color calibration data for the dosimeter chips. The total radiation accumulation is determined from the calibration data. The invention is for emergency use after civil accidents, for ascertaining a threat to military personnel before entering the battlefield or for interrogating a ship at sea.

17 Claims, No Drawings

PHOTOGRAPHING AND MEASURING A TERRITORIAL RADIATION FIELD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to image analysis. Particularly, the invention relates to applications of image analysis to radiation fields. More particularly the invention relates to detecting and measuring a radiation field on the surface of the earth.

2. Discussion of the Related Art

Situations may arise when it is necessary to quickly identify a newly created radiation field on the surface of the earth. Civilian emergencies include a leak from nuclear power plant or loss of radioactive tracing material intended for research or medical use. Military emergencies include a dirty bomb, other battlefield weapons and accidents involving nuclear powered ships. The Governmental could desire to interrogate a ship for radioactive materials without boarding.

There are two methods in use for mapping territorial radiation fields. They rely on a radiation detector in combination with a position indicator such as a Global Positioning Satellite (GPS) instrument. In the first, method, the territory is traversed close to the ground, such as in a land vehicle. Radiation measurements are made in coordination with position and the data recorded. In a second method, the radiation measuring instrument is towed by an aircraft across the suspected radiation field and radiation data recorded in coordination with position data. An alternative to the second method is to carry the radiation measuring instrument by an unmanned aerial vehicle (UAV).

The first two methods are accomplished by exposing humans to potential danger by putting them close to the measured radiation. Even though safety equipment is used, it would be desirable to keep humans at a safe distance from potentially harmful radiation when they are searching for or measuring a suspected territorial radiation field. The alternative to the second method using a UAV measures radiation at a distance above the earth and not at the surface. The radiation at distances above the earth is attenuated and not the dose a human would receive at the surface. In addition, these methods do not provide for photographing a radiation field.

Inventors have discovered that the problems and deficiencies associated with known methods can be solved or greatly reduced by the use of the method of the invention.

SUMMARY OF THE INVENTION

A method has been found for measuring radiation dose received on a territorial area and photographing a radiation field. Dosimeter chips comprising a radiation sensitive, visible color change indicating material fixed on a substrate are distributed over the territorial area. This is followed by aerially photographing the dosimeter chips to produce a color photograph. The color photograph is compared with radiation/color calibration data for the dosimeter chips. The radiation accumulation is determined from the calibration data and recorded. Ordinarily the elapsed time from distribution to photographing is recorded to allow calculation of a rate of change.

The invention is for quickly quantifying the extent and amount of hazardous radiation after an accident, for identifying threats to military personnel on the battlefield and for searching for hidden radiation material.

DETAILED DESCRIPTION OF THE INVENTION

According to the invention, humans need not come near the radiation area to be measured. The invention relies on a radiation sensitive, color change indicating material fixed on a substrate. The radiation sensitive material fixed on the substrate is commercially available for making dosimeter badges. This dosimeter material is made into sheets which are cut to size for inclusion in badges worn by personnel. For use in the invention, the sheets are cut to chip size.

For use in the invention, the sheets must be reduced to a chip size that can be scattered from the air and fall directly to earth. In general, the size must be at least about 1 millimeter or greater so that the chips do not drift appreciably with the wind. The chip size may be generally about 1 millimeter or larger, e.g. 1 millimeter (0.039 inches) to 150 millimeters (5.9 inches), preferably 6 millimeters (0.236 inches) to 150 millimeters (5.9 inches). Chips of this size will fall to earth when dropped from the air. It is desirable that the chips be large enough that they fall directly to earth without significant drifting in the air. This is quantifiable by way of Stokes' Law. It is also desirable that chips be small enough that they land without causing harm to people or damage to property.

The chips are distributed over the area to be measured. If the lateral extent of the radiation field is not known or perhaps changing with time, the chips should be distributed more widely than the territory in which radiation is expected so that the limits of the radiation field can be detected. The density of distribution is determined by the amount of information that is required. A less dense distribution provides less information. A denser distribution provides more information. If it is desired to know information such non-uniformities including hot spots and direction of increase or attenuation, the coverage of chips must be sufficient to indicate this information. Also, if the distribution of chips is not dense, this should be noted so that the absence of data is not mistaken for a false negative indication of radiation. In other applications where it is not necessary to know the lateral area of the potential field, it is not necessary to distribute the chips beyond the potential source. Such an application could be the interrogation of a ship at sea or a container that cannot be approached or accessed.

Size of the dosimeter chips is selected for photographic detection so the selection of size is made in view of the capability of the camera and photographic system available. Photographic detection is a function of the limits of the camera and distance of the camera from the chip. Camera parameters include focal length, field of view and the limits of the silicon chip that converts light into a grid of pixels. If the camera uses photographic film, the film is another camera parameter. Selection of the camera to be used is known in the art. And it is well known that faster results are achievable with a digital camera than with a film camera.

The chips are distributed across the area of the suspected radiation field on the land or sea surface by known methods. U.S. Pat. No. 3,860,202 to R. S. Johnson teaches a Method and Apparatus For Dispensing Granular Material From Aircraft. The crop dusting and spraying arts are instructive for applying solid particulate materials to land areas while guided by GPS. If chips are distributed from the air, it is best to apply the chips in the absence of wind. This is not always possible. Wind conditions should be monitored throughout the dispensing so that no areas in the suspected radiation field will be without some chips. The absence of chips could result in a false negative reading of the photograph. U.S. Pat. No. 5,334,987 for agricultural aircraft control teaches using a global positioning system in combination with the application of chemicals to an agricultural field. Based on stored information, a flight computer produces a flight pattern having the desired orientation and generates signals representative of the amount and direction of deviation from a desired flight pattern. U.S. Pat. No. 5,334,987 to T.I. Teach. In the alternative, the chips may be distributed from the ground with an agricultural type spreader, by hand or by robot.

Water adsorbs radiation so well that it is not usual for an underwater radiation source to produce a significant radiation field at or above the surface of the water. Also, radiation does not travel through the air above the earth's surface to the altitudes where the camera is used. Underwater use of the chips is not included in the invention. Likewise, aerosols of the chips that do not land quickly and instead move about in the air over time with respect to the surface of the earth are not included in the invention.

Dosimeter materials that are sensitive to radiation and quantitatively change color in response there are known in the art. Patents on these materials are found in the U.S. Classification Manual under the subject heading of invisible radiation responsive non-electric signaling and specifically under dosimeters. Useful radiation sensitive, color change indicating materials are diacetylenes, mixtures of radio-chromic dyes and/or pH sensitive dyes with an acid producing compound.

Diacetylenes are colorless solid monomers. They polymerize to visibly colored polymers of the general formula:

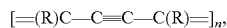

where R is an organic group and n can range between 50 and 1000 or more, either upon thermal annealing or exposure to high-energy radiation, such as short wavelength UV light, x-ray, gamma ray, electrons and neutrons. Diacetylenes polymerize in the solid state and develop a blue or red color.

Another example is taught in U.S. Pat. No. 7,476,874 for a Self Indicating Radiation Alert Dosimeter to G.N. Patel incorporated herein by reference. The patent describes radio-chromic diacetylenes of the general formula:

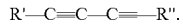

In the formula, R' and R" are independently selected from the group consisting of $(CH_2)_b$—H; $(CH_2)_b$—OH; $(CH_2)_b$—O—CONH—R1; $(CH_2)_b$—O—CO—R1; $(CH_2)_b$—O—R1; $(CH_2)_b$—COOH; $(CH_2)_b$—COOH; $(CH_2)_b$—NH$_2$; $(CH_2)_b$—CONHR1; $(CH_2)_b$—CO—O—R1 and a mixture thereof. In these formulae, b=1 to 10, and M is a cation or $(R1)_3N^+$ wherein R1 is substituted or unsubstituted alkyl or phenyl and symmetrical or asymmetrical fatty acid of R1—$(CH_2)_n$—C≡C—C≡C—$(CH_2)_m$—R2 or a derivative where at least one of the R1 or R2 is —COOH and n and m are independently=1 to 10.

Polymerization, and resulting color development, of diacetylene is independent of radiation rate. At lower doses the color development is linear with total dose. Once complete all diacetylene present has polymerized, the chips are spent and are not capable of indicating additional radiation.

Diacetylenes are the effective radiation sensitive materials. Other radiation sensitive materials can also be used for making the chips. Silver halides include AgCl, AgBr, AgI, silver molybdate, silver titanate, silver mercaptide, silver benzoate, silver oxalate, and mixtures thereof. Another group of materials includes salts and organic, inorganic and organometallic complexes of metals, such as iron, copper, nickel, chromium and transition metals, including mercury oxalate, iron oxalate, iron chloride, potassium dichromate, copper chloride, copper acetate, thallium halides, lead iodide, lithium niobate, and mixtures thereof. Another group of radiation sensitive compositions useful for making the chips includes aromatic diazo compounds, polycondensates of diazonium salts, the naphthoquinone diazides, photopolymers and photoconductive materials.

Another major class of radiation sensitive materials that can be used in the chips are radio-chromic dyes, such as new fuschin cyanide, hexahydroxy ethyl violet cyanide and pararose aniline cyanide, leuco crystal violet, leuco malachite green and carbinol dyes, such as malachite green base and p-roseaniline base. Still other useful materials are those described in U.S. Pat. No. 2,877,169 to L. Chalkley and U.S. Pat. No. 4,377,751 to S. Kronenberg et al.

These radio-chromic dyes and other dyes which change color with change in pH can be used in combination with materials which produce acid upon irradiation such as organic halocompounds, such as trichloroethane, ethyltrichloroacetate, chlorinated paraffins and chlorinated polymers. The acid produced can react with the pH sensitive dye and change color. Certain iodinium salts, such as, diphenyliodinium hexafluoroarsenate, and diphenyliodinium chloride produce protonic acids, such as, HCl, HF, $HBF_4$ and $HASF_6$ upon irradiation with high energy radiation. The sulfonium, iodinium and like compounds in which the primary photochemical reaction produces a super acid and this super acid is employed catalytically to generate other acids. Thus the color development is amplified. Such systems are described in U.S. Pat. No. 6,242,154 to J. M. Grasshoff et al. and the references cited therein.

The preferred radio-chromic diacetylenes of the formula R'—C≡C—C≡C—R" are colorless or white. Radiation in an amount of about 5 electron volts (eV) and greater initiates the polymerization reaction. This is consistent with a radiation dose of 0.1 rad to 5000 rads. A dose of about 1000 rads is fatal to humans. These energy levels are associated with ultraviolet light, x-rays, gamma rays, electrons, protons, alpha chips, and neutrons. Polymerization of diacetylenes proceeds quantitatively. The polymer produced is distinctly colored. The color indicates the extent of polymerization and accordingly, the dose of radiation received. Calibration charts are made by techniques know in the art to correlate color change data with radiation exposure.

In addition, the luminous quality of the chips can be enhanced to facilitate photography. This is achieved by adding radio-luminescence, electron luminescence or fluorescence phosphor materials that emit radiation on lower radiation energy. These materials enhance the fluorescence of the chip on exposure to radiation. This enhancement changes the calibration of the chip for radiation-induced color change.

Although any solid substrate having a smooth surface can be used for coating radiation sensitive shaping formulations and making film, the preferred substrates are flexible and transparent plastic films that facilitate photography from the air. These include cellulose-base papers and synthetic papers. Spunbonded polyolefins are available under the trade name Tyvek® among others. Plastic films, such as polyethylene, polypropylene, polyvinylchloride, polymethylmethacrylate, polyurethanes, nylons, polyesters, polycarbonates, polyvinylacetate, cellophane and esters of cellulose can be used as the transparent substrate. The most preferred substrates are 5 to 300 microns thick films of polyethylene terephthalate.

For purposes of this invention territorial area includes a region of land or sea surface of measurable size. It may be desirable to spread the chips over a ship at sea and the surrounding sea surface to interrogate the ship for radioactive materials. This could be done when direct access to the ship hold is not possible for any of a number of reasons. For this use the specific gravity of the chips must be reduced to less than the density of fresh water or sea water. This is achieved by blowing the substrate while in the molten state with air or nitrogen to entrap the gas in the polymer. Blowing with air or nitrogen is used to increase the volume of the solid substrate without increasing weight. This is used to reduce the density of the chip to less than that of water so that it will float. These chips are particularly useful for dropping around the ship and in its path to interrogate the ship at the water line for radiation dose.

The display by most chemical reaction based dosimeters is influenced by temperature. Some display a higher dose while the others display lower dose if the temperature is higher. The reverse occurs at lower temperature. If the data recorded by the method is to be quantitatively relied on it is necessary to record ambient temperature on the area and to make the appropriate temperature correction. Operating temperature may ordinarily be in the range of −40° C. to +70° C.

Some of the dosimeters do not develop full color instantly. They show some post radiation effect. An example is Gafchromic® dosemitry film available from ISP, 1361 Alps Road, Wayne, N.J. 07470. The final of the 10% to 20% of the color takes about a day to develop. For this reason it is advisable to record the elapsed time between distributing the chips and photographing them.

A color reference chart is created using the same diacetylenes in the chips and polymerized in incremental amounts by radiation to produce the corresponding colors to create a color reference chart. To provide continuity for color analysis, a single color standard must be used. A master slide of this color standard is taken, using the same film batch that will be used for the aerial photographs. These master slides are taken in a series by bracketing the exposures from two stops underexposed to two stops overexposed at one half stop intervals. Other methods for creating a color reference chart with commercially available ink but it can be difficult to match the color of the irradiated chips with these inks particularly under differing light conditions. U.S. Pat. No. 4,365,882 to L. E. Disbrow teaches a Color Standard Method and Apparatus.

The aerial image has a particular spatial resolution of at least a portion of the territorial area of interest, and is registered or referenced using any of a variety of registering or referencing techniques. For example, registering may include synchronizing GPS location data with reference points within the predetermined territorial area. The reference points are preferable landmarks that are visible in the aerial image. For example, a reference point may be provided by a known ground location marked by a visible object or target such as ground markings with brightly colored tape or spray paint. Where there is a relatively hilly terrain, additional targets may be used to improve accuracy of the registration. Flatter terrain may require fewer targets. Registering or referencing points on the aerial image attributes a GPS position to one or more locations on the aerial image. Reference points established in the territorial area are intended to improve GPS accuracy and to facilitate the correlation of initial photographs with later photos.

The aerial image may be taken from any of a variety of aerial vehicles, such as from an airplane, helicopter, blimp, unmanned aerial vehicle (UAV) or earth satellite.

For purposes of photography, the dosimeter chips may be divided into two groups based on size: (a.) about 1 millimeter (0.039 inches) to about 6 millimeters (0.236 inches) and (b.) about 6 millimeters (0.236 inches) to about 150 millimeters (5.9 inches).

The first group of dosimeter chips has a size of about 1 millimeter (0.039 inches) to about 6 millimeters (0.236 inches). A multiplicity of these chips is spread evenly over the territory. The chips may be spread relatively closely spaced based on volume. This is done to identify continuity in the radiation field and to identify the edges or extent of the radiation field. It is not especially challenging to find the chips in a photograph if they are spread relatively closely and uniformly over the area. Nor is it necessary to spatially resolve the chips in these photographs. The primary interest is in capturing an image of their color. The chips are usually photographed from an aircraft or earth satellite at a greater altitude. At greater altitudes, the focal length of the camera is set at its widest field of view and the f-stop is set at or near the maximum available. The resulting photograph yields the color of the chips including variations in color over the area without resolving any individual chips.

This method is particularly useful in photographing the extent of the radiation field. The photograph can show the edges of the radiation field and hot spots within the field. By analogy, the photography of these chips is similar to agricultural photography from NASA's Landsat earth satellite system. Crops such as maize, soy and grass are periodically photographed to evaluate their green color relative to the adjacent earth and the rate of change of the color with respect to time. Color is a measure of the maturing of the crop to estimate crop yield. The photographs record the green color of the crop field without resolving the image of any single leaf or blade of grass. The same or similar photographic techniques are used for the invention. The radiation field or portions of the field are photographically resolved by color differentiation from the surrounding surface without resolving an individual chip. Additional teaching is provided in U.S. Pat. No. 4,227,211 to L. E. Disbrow and U.S. Pat. No. 6,160,902 to M. A. Dickson et al.

The IKONOS® earth observation satellite uses a KODAK® Space Remote Sensing Camera to produce 13,800 pixels with imaging width of 11.3 kilometers and a ground pixel of 82 cm. To ensure that a ground pixel is detectably covered, a multiplicity of chips covering at least three times the minimum ground pixel size should be distributed. From earth orbit a minimum 246 cm wide distribution of chips would be required to produce a photograph for radiation measurement. From a reconnaissance/surveillance aircraft flying at high altitude but considerably lower than a satellite, the minimum required ground distribution size could be reduced. Photography from conventional aircraft at still lower altitudes further reduces the minimum size of surface distribution.

Acquiring an entire aerial image may include taking a plurality of pictures in sequence, and piecing the photographs together to form a composite photograph of the entire area. This provides a photograph of the entire radiation field. If it is desired to measure the surface area of the radiation field, it is necessary to have a photograph in which the radiation field is circumscribed with colored chips. From this photograph, the surface area is measured with a planimeter. The radiation field surface area in digital photographs is measured with the functional equivalent.

The second group of dosimeter chips has a size of 6 millimeters (0.236 inches) to 150 millimeters (5.9 inches). These chips are ordinarily spread relatively thinly over the territory. When the spreading is particularly thin, the challenge may be to find them in the photograph for color evaluation, even with GPS location information. For the purpose of identification it may be necessary to spatially resolve the chips in the photograph or in a series of assembled photographs.

In general chips in the second group are photographed from an altitude of 250 feet to 2000 feet above the chips so that single chips can be found. A single 0.125 inch chip is photographed from an altitude of 250 feed and easily recognized. Likewise, a single 1 inch chip is photographed from an altitude of 2000 feet and easily recognized. In general, the shutter speed should be fast enough to negate the distortions introduced by aircraft velocity and vibration.

The resolution of a system is the some of the resolutions of the components including lenses, film and density of sensors. Resolution is increased by using a lens specially designed for this purpose and by reducing photographic distance. Lenses specially designed for this purpose have a large aperture, i.e. small f-number, and have a long focal length. Resolution is increased by using film having a finer grain or a silicon chip capable of converting light into a greater number of pixels. Photographic distance is reduced by flying at lower altitude. The resolution of each component is calculable. The reciprocal of the resolution of the system is the sum of the reciprocals of the resolutions of the components that make up the system. In practice, the resolution of the system is determined empirically. The results are put in calculators so that camera systems can be compared for a given assignment as shown in Example 1.

The resolution of a camera designed to take such photographs may be selected in combination with the selection of chip size and aerial photographing distance above the chip. A conventional method of improving the range performance is to improve on the optics of the camera. Improvements include increasing the focal length of the optics and improving the f-number, the ratio between the focal length and the aperture size (diameter of the lens). Finding the chips in a photograph can also be aided with the use of radio-chromic dyes and a notch filter.

Photography from a satellite adds to the requirements of the camera used. Satellites carry high resolution, long focal length cameras. This allows a photograph scale comparable to that of aerial photography.

By way of example, assuming an aircraft height over the earth of approximately 1,000 feet, a digital camera can take a single frame to produce a picture of approximately 25 acres. Since this camera has approximately 3,000 by 2,000 pixels (6,000,000 pixels) in one frame, assuming a 25 acre per frame photographic image and since one acre equals 43,560 square feet, each pixel covers 0.1815 square feet or an area of 5.112 inches by 5.112 inches. Thus, the area of each pixel in the field of view is approximately 26.136 square inches when the field of view is 25 acres. When the camera is at a lesser distance from the ground, the frame will cover fewer acres and therefore the area of each pixel in the field of view will be considerably less. U.S. Pat. No. 6,529,616 to L. L. Hendrickson et al. teaches a Method of Determining and Treating the Health of a Crop and is incorporated herein by reference.

By way of example, a digital photograph is taken by a digital camera which has an approximate resolution of 1000 pixels by 1000 pixels. The aerial image provides approximately one square meter per pixel. Alternatively, any of a variety of photographic equipment, resolution, or pixel-to-area ratio is possible. Acquiring the aerial image may include taking a plurality of images in sequence, and piecing the images together to form a composite of the area to show the entire radiation field.

This invention is shown by way of Example.

Example 1

Camera systems were evaluated for use in the aerial photography from an unmanned aerial vehicle (UAV) according to the invention. A computer based calculator routinely employed to answer aerial photography questions was use to evaluate the ability of six camera systems to resolve a dosimeter chip measuring 51.2 millimeters (2.0 inches) by 12.8 mm (0.50 inches) at a distance 102 meters (334.6 feet) above the chip. The implied sensitivity varies between different camera systems. The following results were calculated.

TABLE 1

Uncooled Long Wave Infrared (LWIR) Camera
$\lambda$ 11 μm

| Example | Camera System | Number of pixels | Unit Cell | Focal Length | f/no | IFOV | FOV |
|---|---|---|---|---|---|---|---|
| 1-1 | Small FPA | 320 × 320 | 46.25 μm | 75 mm | 1.0 | 0.617 mrad | 11.31° |
| 1-2 | Medium FPA | 640 × 640 | 28 μm | 75 mm | 1.0 | 0.373 mrad | 13.69° |

IFOV - instantaneous field of view, mrad
FOV - field of view
FPA - focal plane array

| Example | Camera System | FOV Extent | Sample Extent | Airy Extent | Do | Resolution |
|---|---|---|---|---|---|---|
| 1-1 | Small FPA | 20.21 meter | 6.31 cm | 3.66 cm | 3.0 in. | No |
| 1-2 | Medium FPA | 24.47 meter | 3.82 cm | 3.66 cm | 3.0 in. | No |

Do - clear aperture diameter

TABLE 2

Shortwave Infrared Camera
$\lambda$ 1.57 μm

| Example | Camera System | Number of pixels | Unit cell | Focal Length | f/no | IFOV | FOV |
|---|---|---|---|---|---|---|---|
| 1-3 | 50 mm lens Medium FPA | 640 × 640 | 13 μm | 105 mm | 2.1 | 0.124 mrad | 4.54° |

IFOV - instantaneous field of view, mrad
FOV - field of view
FPA - focal plane array

| Example | Camera System | FOV Extent | Sample Extent | Airy Extent | Do | Resolution |
|---|---|---|---|---|---|---|
| 1-3 | 50 mm lens megapixel | 8.11 meter | 1.27 cm | 0.78 cm | 2.0 in. | Yes |

Do - clear aperture diameter

TABLE 3

Visible Camera
λ 0.600 μm

| Example | Camera System | Number of pixels | Unit cell | Focal Length | f/no | IFOV | FOV |
|---|---|---|---|---|---|---|---|
| 1-4 | 50 mm lens megapixel | 1024 × 1024 | 7.4 μm | 90 mm | 1.8 | 0.082 mrad | 4.82° |
| 1-5 | 50 mm lens HDTV FPA | 1920 × 1920 | 7.4 μm | 60 mm | 1.2 | 0.123 mrad | 13.57° |
| 1-6 | 50 mm lens HDTV FPA | 2048 × 2048 | 7.4 μm | 60 mm | 1.2 | 0.123 mrad | 14.47° |

IFOV - instantaneous field of view, mrad
FOV - field of view
HDTV - high definition 1920 pixels width, 1080 lines
FPA - focal plane array

| Example | Camera System | FOV Extent | Sample Extent | Airy Extent | Do | Resolution |
|---|---|---|---|---|---|---|
| 1-4 | 50 mm lens megapixel | 8.62 meter | 0.84 cm | 0.30 cm | 2.0 in. | Yes |
| 1-5 | 50 mm lens HDTV FPA | 24.25 meter | 1.26 cm | 0.30 cm | 2.0 in. | Yes |
| 1-6 | 50 mm lens HDTV FPA | 25.86 meter | 1.26 cm | 0.30 cm | 2.0 in. | Yes |

Do - clear aperture diameter

Example 2

A 4 megapixel camera having a 40° field of view was used to photograph a 450 foot wide area from an altitude of 500 feet. A single 0.25 inch object was easily identified in the photograph.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A method of measuring radiation dose received by a territorial area comprising: the steps:
   a) distributing over the area at least one dosimeter chip comprising a radiation sensitive, color change indicating material fixed on a substrate;
   b) allowing the dosimeter chip to land and a response time for the color change indicating material to pass;
   c) taking an aerial color image of the dosimeter chip;
   d) comparing the color image of the dosimeter chip with radiation/color calibration data for the color change indicating material and determining a total radiation accumulation therefrom.

2. The method of claim 1 additionally comprising in step a: recording geographic position of the dosimeter chip.

3. The method of claim 1 additionally comprising in step d: recording the total radiation accumulation.

4. The method of claim 1 additionally comprising:
   e. measuring and recording an elapsed time between the distributing in step a and taking an aerial color image in step c.

5. The method of claim 1 additionally comprising:
   e. measuring and recording an elapsed time between the distributing in step a and taking an aerial color image in step c and
   f. dividing the total radiation accumulation by the elapsed time to determine a radiation exposure rate.

6. The method of claim 1 additionally comprising:
   measuring and recording background radiation rate.

7. The method of claim 1 wherein the chip size is 1 millimeter to 150 millimeters.

8. The method of claim 1 wherein the chip size is 1 millimeter to 6 millimeters.

9. The method of claim 1 wherein the chip size is 6 millimeters to 150 millimeters.

10. The method of claim 1 wherein the dosimeter chip has a density less than the density of water.

11. The method of claim 1 wherein the radiation sensitive, visible color change indicating material includes a diacetylene selected from the group consisting of:

$$R'-C\equiv C-C\equiv C-R'',$$

wherein R' and R" are independently an organic group.

12. A method of photographing a radiation field distributed over a territorial area comprising the steps:
   a) distributing a multiplicity of dosimeter chips over the area, the dosimeter chip including radio-chromic material capable of producing color change when exposed to ionizing radiation having energy higher than 5 eV;
   b) allowing the chip to land and a response time for the radio-chromic material to pass; and then
   c) photographing the dosimeter chips from above the territorial area to produce a color photograph of the radiation field.

13. The method of claim 12 additionally comprising in step a: recording the geographic position of the dosimeter chips.

14. The method of claim 12 wherein the chip size is 1 millimeter to 150 millimeters.

15. The method of claim 12 wherein the chip size is 1 millimeter to 6 millimeters.

16. The method of claim 12 wherein the chip size is 6 millimeters to 150 millimeters.

17. The method of claim 12 wherein the dosimeter chip has a density less than the density of water.

* * * * *